United States Patent
Kozlow et al.

(10) Patent No.: US 9,588,521 B2
(45) Date of Patent: Mar. 7, 2017

(54) METHOD AND DEVICE FOR GUIDING AN AIRCRAFT DURING A LOW LEVEL FLIGHT

(71) Applicant: Airbus Operations SAS, Toulouse (FR)

(72) Inventors: Boris Kozlow, Toulouse (FR); Yohann Roux, Cugnaux (FR); Julien Nico, Tournefeuille (FR)

(73) Assignee: Airbus Operations SAS (FR)

( * ) Notice: Subject to any disclaimer, the term of this patent is extended or adjusted under 35 U.S.C. 154(b) by 108 days.

(21) Appl. No.: 14/591,131

(22) Filed: Jan. 7, 2015

(65) Prior Publication Data
US 2015/0192927 A1    Jul. 9, 2015

(30) Foreign Application Priority Data
Jan. 8, 2014   (FR) ...................................... 14 50131

(51) Int. Cl.
*G05D 1/06*            (2006.01)
(52) U.S. Cl.
CPC .................................. *G05D 1/0646* (2013.01)
(58) Field of Classification Search
CPC .................................................. G05D 1/0646
See application file for complete search history.

(56) References Cited

U.S. PATENT DOCUMENTS

| | | | | |
|---|---|---|---|---|
| 7,761,193 | B2 * | 7/2010 | Artini | G05D 1/0646 340/959 |
| 7,853,368 | B2 * | 12/2010 | Artini | G01O 5/005 701/3 |
| 8,145,365 | B2 * | 3/2012 | Flotte | G05D 1/0646 701/14 |
| 8,200,421 | B2 * | 6/2012 | Botargues | G08G 5/04 244/180 |
| 8,897,932 | B2 * | 11/2014 | Komatsuzaki | G05D 1/0646 244/17.13 |
| 2007/0150170 | A1 | 6/2007 | Deker | |
| 2009/0177400 | A1 | 7/2009 | Silly et al. | |

FOREIGN PATENT DOCUMENTS

GB         2405847 A    *   3/2005

OTHER PUBLICATIONS

FR Search Report dated Oct. 21, 2014 (FR 14 50131).

* cited by examiner

*Primary Examiner* — Todd Melton
(74) *Attorney, Agent, or Firm* — Lerner, David, Littenberg, Krumholz & Mentlik, LLP

(57) ABSTRACT

The guidance device of the aircraft includes a unit for constructing a flight trajectory of the aircraft, which adapts the height of the flight trajectory to a downstream relief so as to allow the aircraft to clear this downstream relief by implementing a rectilinear climb at maximum rate of climb of the aircraft, along a rectilinear lateral direction corresponding to the direction of the aircraft at the moment of the triggering of the maneuver.

8 Claims, 2 Drawing Sheets

METHOD AND DEVICE FOR GUIDING AN AIRCRAFT DURING A LOW LEVEL FLIGHT

The present invention relates to a method and a device for guidance of an aircraft during a low-height flight.

BACKGROUND OF THE INVENTION

In standard fashion, a low-height (or low-altitude) flight phase, called an LLF (for "Low Level Flight") phase, allows an aircraft to fly at low height, especially so as to follow as closely as possible the terrain overflown, in particular to avoid being pinpointed, while eliminating any risk of collision with a part of said terrain. Such an LLF phase is generally situated at a predetermined terrain height, for example at 500 feet (about 150 meters).

In particular, for a military aircraft, especially a military transport airplane, one of the objectives of a low-height flight is to exploit the masking in relation to the terrain in order to protect itself from threats in hostile geographical regions. Accordingly, in particular to carry out instrument flight operations of IMC ("Instrument Meteorological Conditions") type, a three-dimensional reference trajectory is computed in standard fashion (taking into account the terrain overflown), and the aircraft is guided along this reference trajectory (either automatically with the aid of an automatic piloting system, or manually by following indications presented by a flight director).

The terrain used for the computation of the reference trajectory is the terrain situated in a corridor, termed the safety corridor hereinafter, around the horizontal part of the reference trajectory.

In standard fashion, the width of the safety corridor is predefined to ensure flight safety in flight of IMC type, by considering all the flight conditions which could cause the aircraft to deviate from its reference trajectory.

The deviations with respect to the reference trajectory can be caused by faults with systems of the aircraft. Generally, the safety corridor is symmetric on either side of the horizontal trajectory, deviations to the right or to the left of the trajectory being equiprobable. The width of the safety corridor is the result of the sum of various error values which correspond to the performance of the various systems which contribute to the computation and to the flight of the trajectory. This entails the various causes capable of generating lateral deviations with respect to the reference trajectory. By way of example, it is possible to cite a guidance-related error value which is determined by measuring the maximum deviation by considering all the flight conditions as well as the faults affecting a guidance function, and an error value relating to the determination of the aircraft's position, which is used to implement the guidance function. The guidance function (implementation via an automatic piloting system or a flight director) relies, in fact, on a very precise and very reliable item of information on the position of the aircraft.

When a fault with one of the systems necessary for the proper progress of an LLF operation is detected, the crew is alerted and must trigger an escape maneuver, since continuation of the flight under these degraded conditions is no longer safe. This escape maneuver consists in making the aircraft climb to a safety altitude at which the aircraft no longer risks colliding with the terrain overflown. In standard fashion, during the escape maneuver, the aircraft remains guided laterally along the lateral (or horizontal) part of the reference trajectory and a maximum climb rate is applied to it. A part of the safety corridor also serves to cover lateral deviations of the aircraft with respect to the reference trajectory during an escape maneuver (subsequent for example to a fault with a system).

In particular, the escape maneuver can be initiated subsequent to a fault affecting one of the position sensors which make it possible to calculate the position of the aircraft. The minimum number of position sensors installed aboard the aircraft depends on the safety level envisaged. To guide an aircraft in complete safety along a trajectory situated in a corridor, in flight of IMC type, at least two independent sensors of position are necessary. As in the aforementioned current procedure, the aircraft must also be guided along the horizontal part of the trajectory during the escape maneuver; two position sensors are also necessary during this maneuver. Consequently, to permit LLF operations in flight of IMC type, at least three independent sensors of position must be provided (since two sensors are necessary for guidance during the escape maneuver, and since this maneuver may be triggered subsequent to a fault with one of these sensors).

SUMMARY OF THE INVENTION

The object of the present invention is to remedy the aforementioned drawbacks. It relates to a method of guidance of an aircraft during a low-height flight, making it possible to carry out a flight with two independent position sensors (instead of three in the standard mode of functioning of the LLF operation), while making it possible to perform an escape maneuver in complete safety even after the failure of a position sensor.

According to the invention, said method of the type comprising steps consisting:

a) in constructing a flight trajectory as a function of the relief of the terrain overflown and of a safety corridor, the safety corridor defining limits on either side of the flight trajectory at least in the lateral plane (or horizontal plane) and exhibiting at least one nominal width; and b) in guiding the aircraft along said flight trajectory, is noteworthy in that it comprises an additional step, prior to step a) and consisting in determining the height of the relief, termed the downstream relief, which exists in the forward sense in the direction of flight of the aircraft, and in that step a) consists in adapting, in a repetitive manner, for successive points of the flight trajectory, the height of the flight trajectory to said downstream relief, the height of the flight trajectory (that is to say the vertical profile of the flight trajectory) being adapted at each point considered of the flight trajectory to said downstream relief so as to allow the aircraft to clear said downstream relief, from said point considered, by implementing a rectilinear climb at maximum rate of climb of the aircraft, along a rectilinear lateral direction corresponding to the direction of the aircraft at said point considered.

Thus, by virtue of the invention, the vertical profile (or vertical part) of the low-height flight trajectory is adapted, throughout, to the height of the downstream relief, that is to say of the relief which exists in the forward sense in the direction of flight of the aircraft along the flight trajectory. Within the framework of the present invention, relief is intended to mean any fixed element situated on the terrain forward of the flight trajectory, either natural elements (hills, etc.) or constructions such as buildings for example.

More precisely:

for a rectilinear section of the flight trajectory in the horizontal plane, the vertical profile can descend to the lowest level permitted for low-height flight, since in case it should be necessary to implement an escape maneuver, this rectilinear section will allow the aircraft to carry out the envisaged rectilinear escape maneuver; on the other hand, on the approach to a turn and in a turn (in the horizontal plane), the height of the vertical profile is increased to anticipate an upswing so that in case it should be necessary to implement an escape maneuver, the height of the downstream relief (or obstacle) still to be cleared, by carrying out a rectilinear escape maneuver, is compatible with the performance of the aircraft to overfly this downstream relief.

Preferably, the maximum rate of climb of the aircraft represents a predetermined value.

Moreover, in a preferred embodiment, the method comprises an additional so-called escape step consisting, during the guidance of the aircraft along the flight trajectory, in implementing an escape maneuver if necessary. This escape maneuver consists in making the aircraft climb to a safety height, by flying said aircraft according to a rectilinear escape maneuver at maximum rate of climb of the aircraft, said escape maneuver being rectilinear in the lateral (or horizontal) plane along the direction of the aircraft at the triggering point of the escape maneuver.

The escape maneuver to be carried out (either automatically with the aid of an automatic piloting system, or by manual piloting by following orders provided by a flight director) therefore always consists in making the aircraft climb at a maximum climb rate (as in standard fashion), but doing so by executing a rectilinear maneuver which, by virtue of the adaptation of the vertical profile of the flight trajectory to the downstream relief, allows the aircraft to be able to clear the downstream relief if necessary, doing so without using the aircraft's position (which may not be available or be erroneous), as specified hereinbelow.

The present invention also relates to a device for guidance of an aircraft during a low-height flight.

According to the invention, said guidance device of the type comprising:
  a construction unit configured to construct a flight trajectory of the aircraft, as a function of the relief of the terrain overflown and of a safety corridor, the safety corridor defining limits on either side of the flight trajectory at least in the lateral plane; and
  a guidance unit configured to guide the aircraft along said flight trajectory, is noteworthy in that it comprises, moreover, a processing unit configured to determine the height of the relief, termed the downstream relief, which exists in the forward sense in the direction of flight of the aircraft, and in that said construction unit is configured to adapt, in a repetitive manner, for successive points of the flight trajectory, the height of the flight trajectory to said downstream relief, the height of the flight trajectory being adapted at each point considered of the flight trajectory to said downstream relief so as to allow the aircraft to clear said downstream relief, from said point considered, by implementing a rectilinear climb at maximum rate of climb of the aircraft, along a rectilinear lateral direction corresponding to the direction of the aircraft at said point considered.

Advantageously, said processing unit is configured to extract the relief of the terrain from a terrain database.

Furthermore, in a preferred embodiment, the guidance unit is configured to implement an escape maneuver such as aforementioned.

Moreover, advantageously, the guidance device also comprises a detection unit for detecting a fault situation of at least one particular system of the aircraft, especially of a system for determining the position of the aircraft, an escape maneuver being triggered so as to be implemented by the guidance unit when the detection unit detects such a fault situation.

The present invention relates furthermore to an aircraft, in particular a transport airplane, especially military, which is provided with a guidance device such as that specified hereinabove.

BRIEF DESCRIPTION OF THE DRAWINGS

The figures of the appended drawing will elucidate the manner in which the invention may be embodied. In these figures, identical references designate similar elements.

DESCRIPTION OF THE PREFERRED EMBODIMENTS

Figure 1:
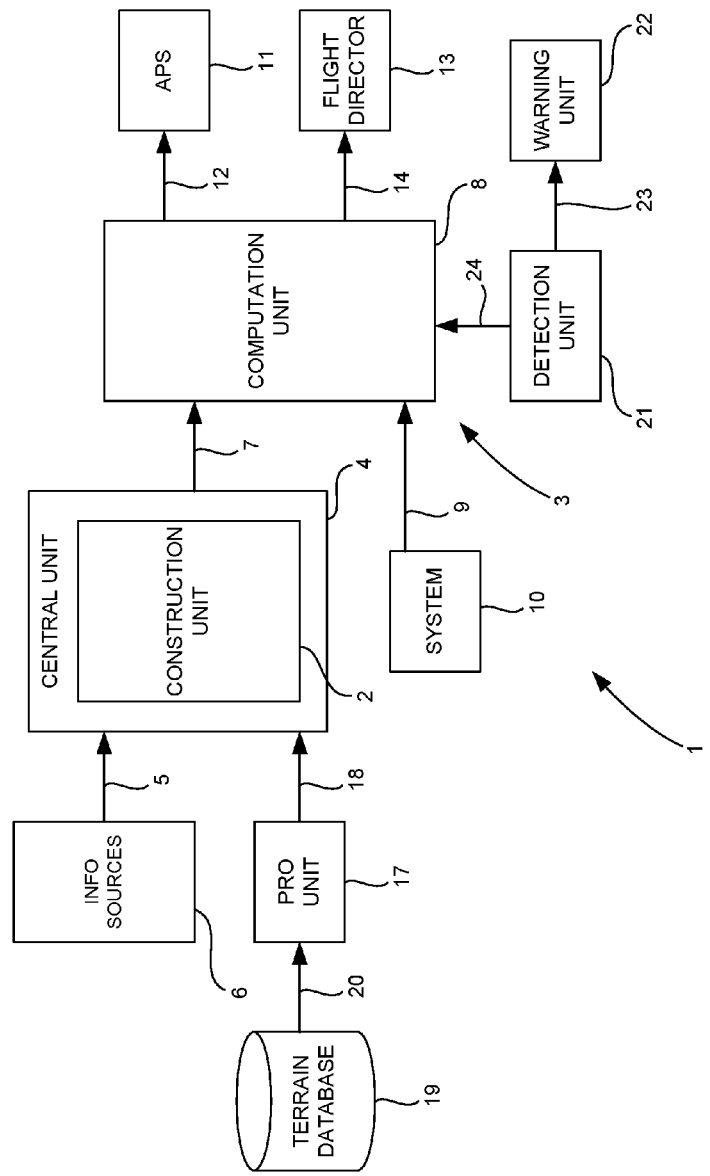
FIG. 1 is the schematic diagram of a guidance device which illustrates an embodiment of the invention.

The guidance device 1 represented schematically in FIG. 1 and making it possible to illustrate the invention, is intended to automatically guide an aircraft AC, in particular a military transport airplane, during a low-height flight along a low-height flight trajectory.

Accordingly, this guidance device 1 which is onboard the aircraft AC, comprises:
  a construction unit 2 configured to construct a three-dimensional flight trajectory of the aircraft AC, as a function of the relief of the terrain overflown and of a safety corridor; and
  a guidance unit 3 configured to guide the aircraft AC along said flight trajectory.

In a particular embodiment, said construction unit 2 forms part of a central unit 4 corresponding, preferably, to a flight management system of FMS type. This central unit 4 is connected by way of a link 5 to a set 6 of standard information sources and by way of a link 7 to a computation unit 8, corresponding preferably to a guidance computer of FGC ("Flight Guidance Computer") type of the guidance unit 3. The computation unit 8 is formed so as to compute guidance speeds, as a function of the flight trajectory (especially at low height) received from the construction unit 2 via the link 7 and of a current position indication, received via a link 9 from a system 10 for determining the current position of the aircraft AC. This system 10 of standard type can comprise, especially, a position computer which calculates the current position of the aircraft on the basis of information received from position sensors, and in particular of information received from GPS receivers and/or one or more air and inertial data generating units.

The guidance unit 3 comprises, in addition to the computation unit 8:
  a standard automatic piloting system 11 which is able to automatically pilot the aircraft AC, as a function of guidance orders received from the computation unit 8 via a link 12; and/or
  a flight director 13 which presents piloting indications to the pilot on a dedicated screen, as a function of guidance orders received from said computation unit 8 via a link 14.

The flight trajectory TV (FIGS. 2 and 3) is constructed, in standard fashion, by the construction unit 2 as a function of the relief of the terrain overflown, illustrated by an obstacle 16 represented very schematically and corresponding for example to a hill, and of a safety corridor 15. The safety corridor 15 defines limits L1 and L2, on either side of the flight trajectory TV at least in the lateral (or horizontal) plane.

In standard fashion, the width of the safety corridor 15 is defined so as to ensure flight safety, by considering all the flight conditions which could cause the aircraft AC to deviate from its reference trajectory (flight trajectory TV to be followed) and cause the aircraft AC to collide with the terrain (an exit from the safety corridor 15 being considered to be catastrophic). The deviations with respect to the reference trajectory may be caused by faults with diverse systems of the aircraft, such as the system 10 for example. In standard fashion, the width of the safety corridor 15 is the result of the sum of various error values which correspond to the performance of various contributors. This entails the various causes capable of generating lateral deviations with respect to the reference trajectory.

According to the invention, said guidance device 1 comprises, moreover, a processing unit 17 configured to determine the height of the relief, termed the downstream relief, which exists in the forward sense in the direction of flight of the aircraft AC.

Moreover, according to the invention, said construction unit 2 is configured to adapt, in a repetitive manner, for successive points of the flight trajectory, the height H of the flight trajectory TV to the height H0 of said downstream relief, received from the processing unit 17 via a link 18. The height H of the flight trajectory is adapted, at each point considered of the flight trajectory, to that of the downstream relief, so as to allow the aircraft AC to clear said downstream relief, from said point considered, by implementing a rectilinear climb at maximum rate of climb of the aircraft AC, in a rectilinear lateral direction corresponding to the direction of the aircraft AC at said point considered (that is to say at the moment of the triggering, as specified hereinbelow, of the climb maneuver).

In a particular embodiment, the processing unit 17 extracts the downstream relief from a standard terrain database 19, which is for example connected by way of a link to said processing unit 17, and determines the height of the obstacles 16 of the downstream relief thus extracted.

The processing unit 17 in charge of the extraction of the terrain therefore identifies the height H0 of the obstacles 16, especially around the region of turns, so that the construction unit 2 can increase the height H of the vertical profile T2 of the flight trajectory TV in such a way that the aircraft AC can clear all the obstacles 16 in case of implementation of a particular escape maneuver.

Figure 2:
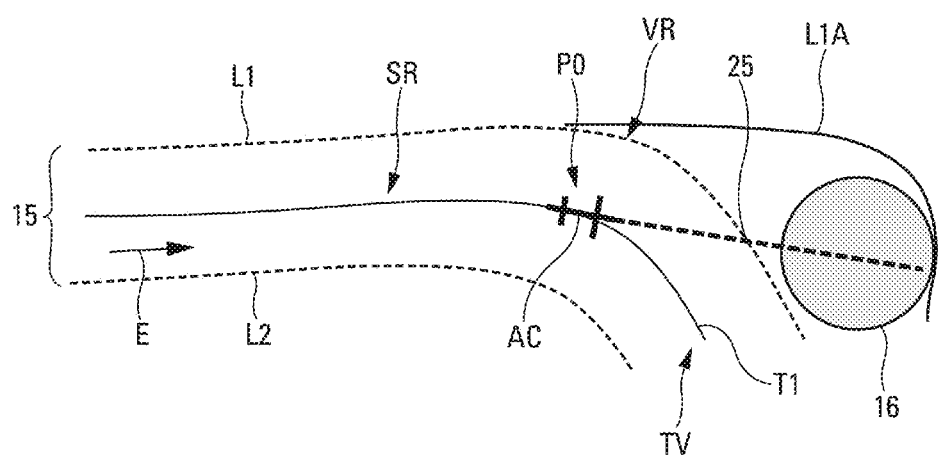
FIGS. 2 and 3 show, respectively in a horizontal plane and in a vertical plane, one and the same flight trajectory followed by an aircraft implementing an escape maneuver.
Figure 3:
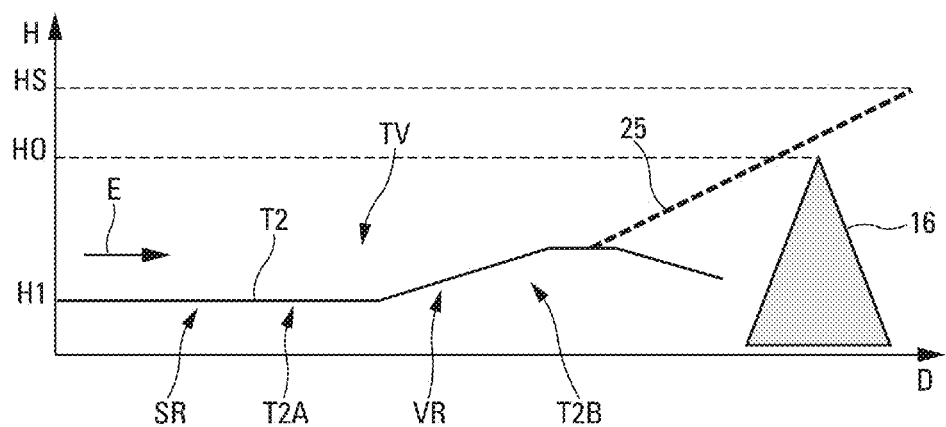

By way of illustration, for one and the same flight trajectory TV, there has been represented:
- in FIG. 2, the horizontal (or lateral) trajectory T1, that is to say the part of the flight trajectory TV in the horizontal (or lateral) plane; and
- in FIG. 3, the vertical profile T2, that is to say the part of this flight trajectory TV in the vertical plane, as a function of a distance D along the flight.

Thus, by virtue of the invention, the vertical profile T2 of the low-height flight trajectory TV is adapted, at any point, to the height H0 of the downstream relief 16. The relief 16 comprises any fixed element of the terrain situated forward of the flight trajectory, either natural elements (hills, etc.) or constructions such as buildings for example.

More precisely:
- for a rectilinear flight section SR (in the lateral plane), the height H of the vertical profile T2 can descend to the lowest level permitted for low-height flight, as illustrated by a part T2A of the vertical profile T2 in FIG. 3, in this instance at a height H1 for the example of FIGS. 2 and 3, since in case of escape maneuver, the aircraft AC will always be able to carry out a rectilinear escape maneuver on the basis of this rectilinear section SR;
- on the other hand, on the approach to a turn VR and in this turn VR, the height H of the vertical profile T2 is increased to anticipate an upswing, as illustrated by a part T2B of the vertical profile T2 in FIG. 3, so that in case of fault, the height H0 of the downstream relief 16 still to be cleared, on carrying out the rectilinear escape maneuver, is compatible with the performance of the aircraft AC to overfly this downstream relief 16. In this case, the lateral limits of the safety corridor 15 are widened in a turn (toward the outside), as shown for a limit L1A in FIG. 2.

The escape maneuver 25 to be carried out (either automatically with the aid of the automatic piloting system 11, or by manual piloting by following orders provided by the flight director 13), always consists in making the aircraft AC climb at a maximum climb rate (as in standard fashion), but doing so by executing a rectilinear maneuver 25 which, by virtue of the adaptation of the vertical profile T2 of the flight trajectory TV of the downstream relief 16, allows the aircraft AC to be sufficiently high (at the moment of the triggering, illustrated by a position P0 in FIG. 2, of the maneuver 25) to be able to clear this downstream relief 16 as a function of its climb capabilities, used to the maximum.

This rectilinear escape maneuver 25 can be implemented without using the position (which may not be available or be erroneous) of the aircraft AC. Consequently, the guidance device 1 will require the use of only two independent position sensors for the implementation of an LLF operation in flight of IMC type, instead of three position sensors currently.

The escape maneuver 25 consists in making the aircraft AC climb in a rectilinear manner, wings flat, without lateral guidance, doing so at the maximum rate of climb of the aircraft AC. This escape maneuver 25 is simplified and will always be carried out in the same manner.

In a particular embodiment, the processing unit 17 and the terrain database 19 are integrated into the central unit 4.

Moreover, the guidance device 1 also comprises a detection unit 21 for detecting a fault situation of a system, for example of the system 10, of the aircraft AC. The unit 21 is presented in a general manner and can implement the detection of various types of fault affecting the progress of the flight. In particular, it may entail a faulty system, which directly dispatches a pertinent fault information item.

An escape maneuver is implemented by the guidance unit 3 when the detection unit 21 detects a fault situation. Indeed, when a fault with one of the systems necessary for the proper progress of an LLF operation is detected by the detection unit 21, the crew is alerted by a warning unit 22 (of audible and/or visual type) installed in the flight deck of the aircraft AC and connected by way of a link 23 to the detection unit 21. In this case, the crew triggers an escape maneuver, since continuation of the flight under these degraded conditions is no longer safe. The escape maneuver can also be triggered automatically, for example via a link 24 which is linked to the central unit 8 (or to a system 11, 13 intended for the piloting). This escape maneuver 25 consists in making the aircraft AC climb to the standard safety altitude HS at which the aircraft AC no longer risks colliding with the terrain 16 overflown.

The guidance unit 3 is therefore configured to implement an escape maneuver 25 consisting in making the aircraft AC climb to a safety height HS, by flying said aircraft AC according to a climb maneuver at a maximum climb rate, by executing a rectilinear maneuver 25 which, by virtue of the adaptation of the vertical profile T2 of the flight trajectory TV to the downstream relief 16, allows the aircraft AC to be able to clear the downstream relief. Accordingly, this simplified escape maneuver is anticipated throughout the low-altitude flight trajectory TV, by adapting the vertical (flight) profile T2 as a function of the height H0 of the obstacles 16 which would have to be cleared during such an escape maneuver 25.

The invention claimed is:

1. A method of guidance of an aircraft during a low-height flight, said method comprising:
   a) constructing, by a construction unit, a flight trajectory as a function of the relief of the terrain overflown and of a safety corridor, the safety corridor defining limits on either side of the flight trajectory at least in the lateral plane;
   b) guiding the aircraft, by a guidance unit, along said flight trajectory; and
   prior to step a), determining the height of the relief, termed the downstream relief, by a processing unit, the downstream relief existing in the forward sense in the direction of flight of the aircraft,
   wherein step a) further comprises adapting by the construction unit, in a repetitive manner, for successive points of the flight trajectory, the height of the flight trajectory to said downstream relief, the height of the flight trajectory being adapted, at each point considered of the flight trajectory, to said downstream relief so as to allow the aircraft to clear said downstream relief from said point considered by implementing a rectilinear climb at maximum rate of climb of the aircraft, along a rectilinear lateral direction corresponding to the direction of the aircraft at said point considered.

2. The method as claimed in claim 1, wherein the maximum rate of climb of the aircraft represents a predetermined value.

3. The method as claimed in claim 1, further comprising an escape step implemented by the guidance unit, the escape step comprising, during the guidance of the aircraft, making the aircraft climb to a safety height, by flying said aircraft according to a rectilinear escape maneuver at maximum rate of climb of the aircraft, said escape maneuver being rectilinear in the lateral plane along the direction of the aircraft at the triggering point of the escape maneuver.

4. A device for guidance of an aircraft during a low-height flight, said device comprising:
   a construction unit configured to construct a flight trajectory of the aircraft, as a function of the relief of the terrain overflown and of a safety corridor, the safety corridor defining limits on either side of the flight trajectory at least in the lateral plane;
   a guidance unit configured to guide the aircraft along said flight trajectory; and
   a processing unit configured to determine the height of the relief termed the downstream relief, which exists in the forward sense in the direction of flight of the aircraft,
   wherein said construction unit is configured to adapt, in a repetitive manner, for successive points of the flight trajectory, the height of the flight trajectory to said downstream relief, the height of the flight trajectory being adapted at each point considered of the flight trajectory to said downstream relief so as to allow the aircraft to clear said downstream relief from said point considered by implementing a rectilinear climb at maximum rate of climb of the aircraft, along a rectilinear lateral direction corresponding to the direction of the aircraft at said point considered.

5. The device as claimed in claim 4, wherein said processing unit is configured to extract the relief of the terrain from a terrain database.

6. The device as claimed in claim 4, wherein the guidance unit is configured to implement an escape maneuver consisting in making the aircraft climb to a safety height, by flying said aircraft according to a rectilinear escape maneuver at maximum rate of climb of the aircraft, said escape maneuver being rectilinear in the lateral plane along the direction of the aircraft at the triggering point of the escape maneuver.

7. The device as claimed in claim 6, further comprising a detection unit for detecting a fault situation of at least one system of the aircraft, an escape maneuver being triggered so as to be implemented by the guidance unit when the detection unit detects such a fault situation.

8. An aircraft comprising a guidance device comprising:
   a construction unit configured to construct a flight trajectory of the aircraft, as a function of the relief of the terrain overflown and of a safety corridor, the safety corridor defining limits on either side of the flight trajectory at least in the lateral plane;
   a guidance unit configured to guide the aircraft along said flight trajectory; and
   a processing unit configured to determine the height of the relief termed the downstream relief, which exists in the forward sense in the direction of flight of the aircraft,
   wherein said construction unit is configured to adapt, in a repetitive manner, for successive points of the flight trajectory, the height of the flight trajectory to said downstream relief, the height of the flight trajectory being adapted at each point considered of the flight trajectory to said downstream relief so as to allow the aircraft to clear said downstream relief from said point considered by implementing a rectilinear climb at maximum rate of climb of the aircraft, along a rectilinear lateral direction corresponding to the direction of the aircraft at said point considered.

* * * * *